(12) United States Patent
Vermersch et al.

(10) Patent No.: US 11,287,513 B2
(45) Date of Patent: Mar. 29, 2022

(54) RADAR DEVICE FOR A MOTOR VEHICLE AND METHOD FOR CONTROLLING THE DEVICE

(71) Applicant: Aptiv Technologies Limited, St. Michael (BB)

(72) Inventors: Jerome Vermersch, Saint Mard (FR); Azziz Maroc, Paris (FR); Jerome Coudre, Bailly-Romainvilliers (FR)

(73) Assignee: Aptiv Technologies Limited, St. Michael (BB)

( * ) Notice: Subject to any disclaimer, the term of this patent is extended or adjusted under 35 U.S.C. 154(b) by 333 days.

(21) Appl. No.: 16/456,806

(22) Filed: Jun. 28, 2019

(65) Prior Publication Data

US 2020/0011966 A1 Jan. 9, 2020

(30) Foreign Application Priority Data

Jul. 5, 2018 (FR) ........................................ 1856202

(51) Int. Cl.
*G01S 7/282* (2006.01)
*G01S 13/06* (2006.01)
*G01S 13/931* (2020.01)
*G01S 13/00* (2006.01)

(52) U.S. Cl.
CPC .............. *G01S 7/282* (2013.01); *G01S 13/06* (2013.01); *G01S 13/931* (2013.01); *B60Y 2200/10* (2013.01); *G01S 2013/93271* (2020.01); *G01S 2013/93272* (2020.01); *G01S 2013/93274* (2020.01)

(58) Field of Classification Search
CPC . G01S 7/285; G01S 7/34; G01S 13/12; G01S 13/18
See application file for complete search history.

(56) References Cited

U.S. PATENT DOCUMENTS

| | | | |
|---|---|---|---|
| 5,160,933 A * | 11/1992 | Hager | G01S 13/18 342/174 |
| 5,345,470 A | 9/1994 | Alexander | |
| 5,485,159 A | 1/1996 | Zhang et al. | |
| 5,670,962 A * | 9/1997 | Henderson | G01S 13/931 342/70 |
| 6,587,071 B2 * | 7/2003 | Meier | G01S 13/12 342/70 |
| 2002/0163463 A1 | 11/2002 | Lajiness et al. | |
| 2006/0109170 A1 | 5/2006 | Voigtlaender et al. | |

(Continued)

*Primary Examiner* — Bernarr E Gregory
(74) *Attorney, Agent, or Firm* — Sawtooth Patent Group PLLC

(57) ABSTRACT

A radar device for a motor vehicle comprises a radar antenna configured to detect a reflected signal characterized as a reflection of a transmitted signal reflected by an object present in the field of view of the radar antenna; a controller configured to transmit at least one radar signal from the radar antenna, the radar signal being transmitted according to a determined object detection transmission power; the controller being configured to detect the power level of the reflected signal derived from the transmitted radar signal reflected by the detected object; the controller being configured to adjust the transmission power, according to the power level of the reflected signal detected, to a minimum power sufficient for the detection of the detected object.

8 Claims, 8 Drawing Sheets

(56) References Cited

U.S. PATENT DOCUMENTS

| | | |
|---|---|---|
| 2010/0277359 A1 | 11/2010 | Ando |
| 2012/0129459 A1 | 5/2012 | Hsieh et al. |
| 2013/0015999 A1 | 1/2013 | Alland |
| 2015/0160065 A1* | 6/2015 | Sai .......................... G01S 7/34 342/21 |
| 2015/0160066 A1* | 6/2015 | Sai .......................... G01S 7/285 342/21 |

* cited by examiner

RADAR DEVICE FOR A MOTOR VEHICLE AND METHOD FOR CONTROLLING THE DEVICE

CROSS-REFERENCE TO RELATED APPLICATION

This application claims the benefit under 35 U.S.C. § 119(a) of French Patent Application FR 1856202, filed Jul. 5, 2018, the entire disclosure of which is hereby incorporated herein by reference.

TECHNICAL FIELD

This disclosure generally relates to a radar device for a motor vehicle and its control method, and more particularly relates to the adjustment of the transmission power of the radar signal of the device in case of obstruction of the field of view of the radar.

BACKGROUND

The motor vehicles are increasingly equipped with drive assistance systems. A widely used technology in this context is the radar. The radar systems help the driver and can be used to detect the obstacles in the front, in the rear or on the sides of the vehicle.

Basically, the principle of the radar detection sends a fixed-frequency wave in a permitted frequency band with a given bandwidth. In addition, a certain transmission power is applied to have a detection range sufficient to detect obstacles distant from the vehicle.

When two or more vehicles equipped with radar systems are in the vicinity of each other, the field of view of a vehicle radar can be obstructed by another vehicle. This induces a useless electrical energy consumption associated with the radar.

SUMMARY

According to one embodiment, a radar device for a motor vehicle comprises a radar antenna configured to detect a reflected signal characterized as a reflection of a transmitted signal reflected by an object present in the field of view of the radar antenna; a controller configured to transmit at least one radar signal from the radar antenna, the radar signal being transmitted according to a determined object detection transmission power; the controller being configured to detect the power level of the reflected signal derived from the transmitted radar signal reflected by the detected object. The controller is configured to adjust the transmission power, according to (i.e. based on) the power level of the reflected signal detected, to a minimum power sufficient for the detection of the detected object.

The controller may also be configured to transmit a plurality of successive radar signals according to the determined transmission power, the controller being configured to adjust the transmission power according to the average of the power levels of the reflected signals detected.

The reflected signal may comprise a plurality of reflected waves distributed in the field of view of the radar antenna so that the controller can be configured to detect the power level and the angular orientation, along the main axis of the field of view, of each reflected wave. The controller is configured to determine a rate of obstruction of the field of view of the radar antenna according to the power level and angular orientation of each reflected wave detected. The controller is configured to compare the obstruction rate determined with a preset obstruction rate threshold. The controller can be configured to adjust the transmission power when the obstruction rate is higher than the preset obstruction rate threshold.

According to another embodiment, a method for controlling a radar device comprises the steps of: transmitting at least one radar signal, according to a determined object detection transmission power, from the radar antenna; detecting the power level of the reflected signal derived from the transmitted radar signal reflected by the detected object; characterized in that the method comprises the step of: adjusting the transmission power, according to the detected power level of the reflected signal, to a minimum power sufficient for the detection of the detected object.

The transmission step may comprise the successive transmission of a plurality of radar signals according to the same preset transmission power and the step of adjusting the transmission power may comprise the adjustment of the transmission power according to the average of the power levels of the reflected signals detected.

The reflected signal may comprise a plurality of reflected waves distributed in the field of view of the radar antenna so that the step of detecting the power level of the reflected signal comprises the step of detecting the power level and angular orientation, along the main axis of the field of view, of each reflected wave. The step of adjusting the transmission power may comprise a prior step of determining a rate of obstruction of the field of view of the radar antenna according to the power level and angular orientation of each reflected wave detected and a step of comparing the determined obstruction rate with a preset obstruction rate threshold. The step of adjusting the transmission power may comprise a step of adjusting the transmission power when the obstruction rate is higher than the preset obstruction rate threshold.

According to another embodiment, a method for controlling a radar device arranged in a host vehicle comprises the steps of: transmitting a radar signal of the host vehicle according to a determined object detection power; detecting a reflected signal derived from the transmitted radar signal; determining the presence of a target vehicle in the field of view of the radar device; determining a rate of obstruction of the field of view of the radar antenna; comparing the determined obstruction rate with a preset obstruction rate threshold; reducing the transmission power of the radar signal to a minimum target vehicle detection power when the obstruction rate is higher than the preset obstruction rate threshold.

According to another embodiment, a method for detecting an object by a host vehicle comprising a vehicle-to-vehicle communication system comprises the steps of: comparing the rate of obstruction of the field of view of a radar device with the preset obstruction rate threshold; allocating the function of detecting an object in the field of view of the radar device to the vehicle-to-vehicle communication system when the obstruction rate is higher than the preset obstruction rate threshold; determining the location coordinates of the obstructed field of view; detecting the data, received by the vehicle-to-vehicle communication system, relating to an object present in the field of view obstructed according to the determined location coordinates.

Further features and advantages will appear more clearly on a reading of the following detailed description of the preferred embodiment, which is given by way of non-limiting example only and with reference to the accompanying drawings.

BRIEF DESCRIPTION OF DRAWINGS

Other characteristics, objects and advantages of the invention will become apparent upon reading the following detailed description, and in relation to the appended drawings, given as a non-limiting example and in which.

DETAILED DESCRIPTION

Figure 1:
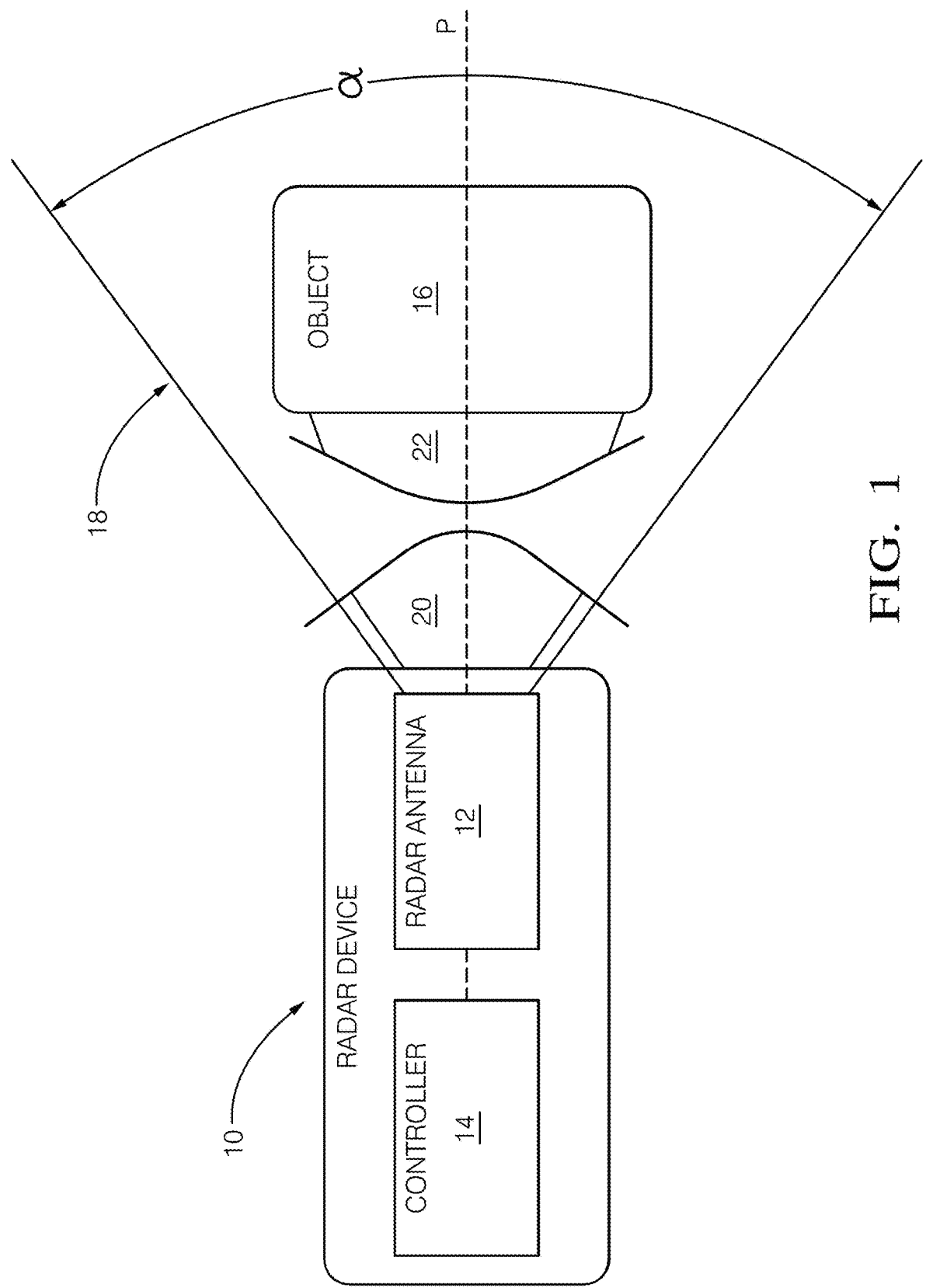
FIG. 1 is a schematic view of a radar device in a first operating mode according to one embodiment.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

In order to facilitate the description, and in a non-limiting manner, a longitudinal axis L and a transverse axis T are defined. "Left", "right" and "lateral" orientations are defined in the transverse direction. "Front" and "rear" orientations are also defined in the longitudinal direction.

According to FIG. 1, a radar device 10 comprises a radar antenna 12 and a controller 14. The radar device is configured to detect the presence of an object 16 in the field of view 18 of the radar antenna 12.

The controller 14 is configured to transmit to the radar antenna 12 a radar signal of determined transmission power, so that the radar antenna 12 transmits the radar signal 20 in its field of view 18 along its main transmission axis P. The angular aperture α of the field of view 18 extends symmetrically on either side of the main transmission axis P of the radar device 10. The level of the transmission power of the transmitted radar signal 20 and the angular aperture α of the field of view 18 of the radar antenna 12 are determined in order to detect the object 16 present in the field of view 18 up to a maximum distance along the main transmission axis P of the radar device 10.

The radar antenna 12 is also configured to detect a reflected signal 22 characterized as a reflection of the transmitted signal 20 reflected by the object 16 in the field of view 18 of the radar antenna 12. The controller 14 is also configured to detect the power level of the reflected signal 22 detected by the radar antenna 12.

According to the invention, the controller 14 is configured to adjust the level of the transmission power in particular according to the power level of the reflected radar signal detected. This characteristic of the radar device 10 of the invention makes it possible in particular to adjust the energy consumption as well as possible. More particularly, the controller 14 is configured to adjust the power transmission, according to the power level of the reflected radar signal 22 detected, to a minimum power sufficient for the detection of the detected object 16. In other terms, the controller 14 adjusts the maximum object detection distance according to the power level of the reflected radar signal 22 by said detected object 16.

For example and in a non-limiting manner, if the transmission power of the radar device 10 is previously determined according to a default level in order to detect an object 16 up to a distance of 200 meters from the radar device 10 according to a field of view of 150 degrees, and if the detected object 16 is located at a distance in the order of a few meters, then the power level of the signal 22 reflected by said object will be analyzed by the controller 14 as being high so that the level of the transmission power of the transmitted radar signal 20 will be readjusted according to a minimum transmission power level necessary for detecting the object 16 located to within a few meters from the radar device 10. However, when the object 16 leaves the field of view 18 of the radar device 10, then the transmission power level of the transmitted radar signal 20 is readjusted according to its default value, that is to say, a value allowing an object detection up to 200 meters according to an angular aperture α of the field of view of 150 degrees, namely+/−75 degrees on either side of the main transmission axis P.

In order not to constantly adjust the transmission power of the transmitted radar signal 20, the controller 14 may be configured to transmit a plurality of successive radar signals 20 according to the determined transmission power for a determined period of time, the controller 14 being configured to adjust the transmission power according to the average of the power levels of the reflected signals 22 detected. This method for adjusting the transmission power of the transmitted signal radar 20 also makes it possible to confirm the presence of an object 16 in the field of view 18 of the radar device 10 for a determined period of time.

In a non-limiting manner, the radar device 10 may for example transmit radar signals 20 in the field of view 18 of the radar antenna 12 every 50 milliseconds so that the controller 14 can average the power levels of the reflected signals 22 received by the radar antenna 12 and detected by the controller 14 over a period of 500 milliseconds.

Figure 2:
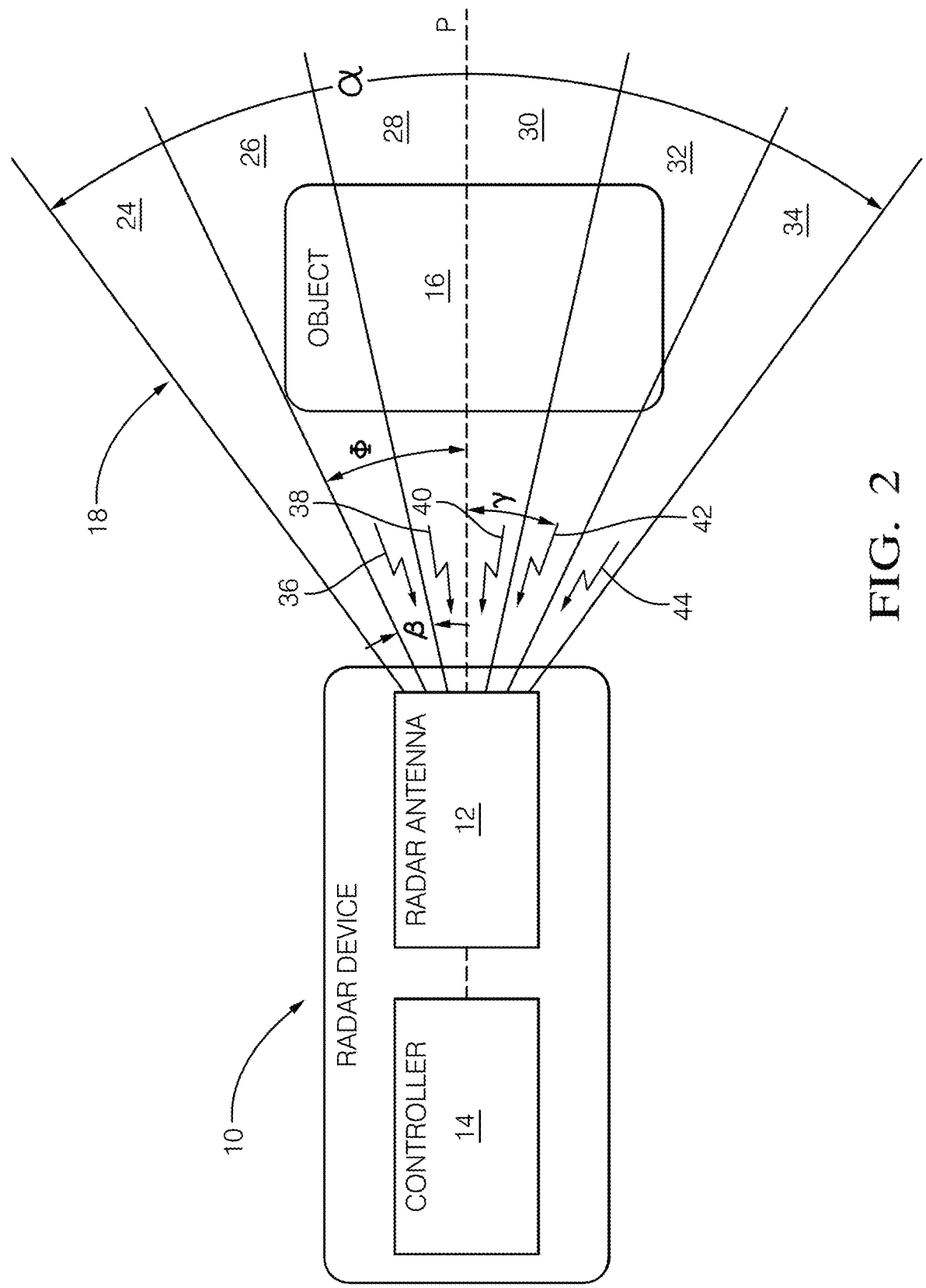
FIG. 2 is a schematic view of the radar device of FIG. 1 according to a second operating mode.

According to FIG. 2, the controller 14 is configured to distribute the field of view into a plurality of portions of field of view 24, 26, 28, 30, 32, 34 extending on either side of the main transmission axis P the radar device 10. The plurality of portions of field of view 24, 26, 28, 30, 32, 34 fully covers the field of view 18 of the radar device 10. Each portion of field of view 24, 26, 28, 30, 32, 34 is characterized by its angular aperture β. Preferably, all of the portions of field of view 24, 26, 28, 30, 32, 34 have an identical angular aperture β. The controller 14 is configured to locate each portion of the field of view 24, 26, 28, 30, 32, 34 according to its angular distance φ from the main transmission axis P of the radar device 10.

According to FIG. 2, the reflected signal 22 comprises a plurality of reflected waves 36, 38, 40, 42, 44 distributed in the field of view 18 of the radar antenna 12. Each reflected wave 36, 38, 40, 42, 44 is characterized by its angular orientation γ along the main axis P of the field of view 18. Each reflected wave 36, 38, 40, 42, 44 received by the radar antenna 12 comes from a portion of the field of view 26, 28, 30, 32, 34. The angular orientation γ of each reflected wave 36, 38, 40, 42, 44 allows the controller 14 to associate each reflected wave 36, 38, 40, 42, 44 to the portion of the field of view 26, 28, 30, 32, 34 in which it propagates towards the radar device 10. When the detected object 16 is close to the radar antenna, the field of view 18 is partially or complementarily obstructed by said object 16. More precisely, the more the object 16 detected in the field of view 18 is close to the radar device 10, the more a plurality of portions of the field of view 28, 30, 32, 34 is obstructed by the detected object 16. According to the invention, the controller is configured to determine a rate of obstruction of the field of view 18 of the radar antenna 12 according to the power level and angular orientation γ of each reflected wave detected.

The 'obstruction rate' is the rate between the obstructed portions of the field of view 26, 28, 30, 32, 34 and the whole field of view 18. In a non-limiting manner, a method for determining the obstruction of the portions of field of view by the controller 14 consists in determining the power level of the reflected waves 36, 38, 40, 42, 44 of the portions of field of views 26, 28, 30, 32, 34 directly adjacent to each other, and by detecting a power level of the reflected waves 36, 38, 40, 42, 44 of the portions of field of view 26, 28, 30, 32, 34 adjacent to each other in the same order of magnitude. The order of magnitude of the power level of the reflected waves 36, 38, 40, 42, 44 of the portions of field of view 26, 28, 30, 32, 34 directly adjacent to each other when they are obstructed is generally detected and considered to be raised by the controller 14, the detected object being generally at a close distance, that is to say within a few meters, from the radar device 10.

The controller 14 is configured to compare the determined obstruction rate with a preset obstruction rate threshold.

The controller 14 can then be configured to adjust the transmission power when the obstruction rate is higher than the preset obstruction rate threshold.

For example and in a non-limiting manner, the power of the transmission signal can be reduced if the field of view 18 is obstructed at more than 90% by the detected object 16. The transmission power can be adjusted to a minimum power sufficient for the detection of the object 16 present in the field of view 18.

Figure 3:
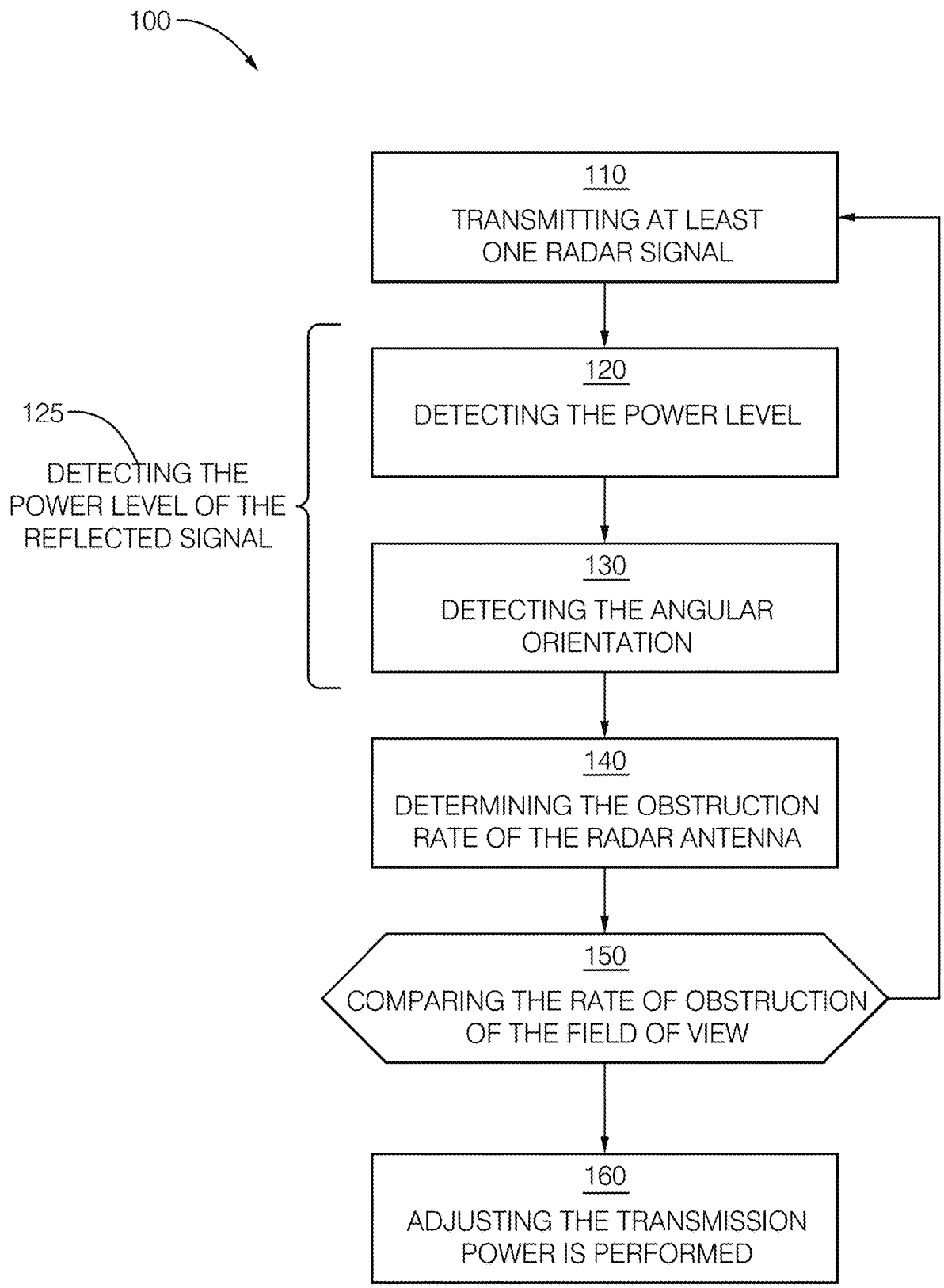
FIG. 3 is a flowchart of a method for controlling the radar device of FIG. 1.

According to FIG. 3, a method 100 for controlling the radar device described above and illustrated in FIG. 1 comprises several steps.

In order to detect an object 16 in the field of view 18 of the radar antenna 12, the method comprises a step 110 of transmitting at least one radar signal 20, according to a determined object detection transmission power, from the radar antenna 12 then another step 125 of detecting the power level of the reflected signal 22 derived from the transmitted radar signal 20 reflected by the detected object 16. In order to limit the energy consumption of the radar device 10, a step of the method 100 for controlling the radar device 10 comprises a step 160 of adjusting the transmission power according to the detected power level of the reflected signal 22 to a minimum power sufficient for the detection of the detected object 16.

To confirm the presence of the object in the field of view 18, the step 110 of transmitting the radar signal 20 may comprise the successive transmission of a plurality of radar signals 20 according to the same determined transmission power, in particular at a regular time interval and then the step 160 of adjusting the transmission power is performed according to the arithmetic average of the power levels of the reflected signals 22 detected.

In order to decrease the transmission power of the transmitted radar signal 20 when the field of view 18 of the radar device 10 beyond the detected object 16 is not necessary, either because the field of view 18 is obstructed or because the non-obstructed field of view is too narrow, the step 160 of adjusting the transmission power is preceded by a step 150 of comparing the rate of obstruction of the field of view 18 with a preset obstruction rate threshold. Finally, the step 160 of adjusting the transmission power comprises a step of decreasing the default transmission power of the radar device 10 when the rate of obstruction of field of view 18 is higher than the preset obstruction rate threshold.

In order to determine the rate of obstruction of the field of view 18, and since the reflected signal 22 comprises a plurality of reflected waves 36, 38, 40, 42, 44 distributed in the field of view 18 of the radar antenna 12, the step 125 of detecting the power level of the reflected signal 22 comprises a step 120 of detecting the power level and a step 130 of detecting the angular orientation γ, along the main axis P of the field of view 18, of each reflected wave 36, 38, 40, 42, 44. Finally, the step 140 of determining the obstruction rate of the radar antenna 12 is therefore performed according to the power level and angular orientation γ of each reflected wave 36, 38, 40, 42, 44 detected.

It should be noted that, when the radar device 10 is configured according to the power adjusted to the minimum object detection power 16, when the object 16 is no longer detected, the controller 14 is configured to readjust the transmission power to the default object detection nominal power 16 of the radar device 10.

Figure 4:
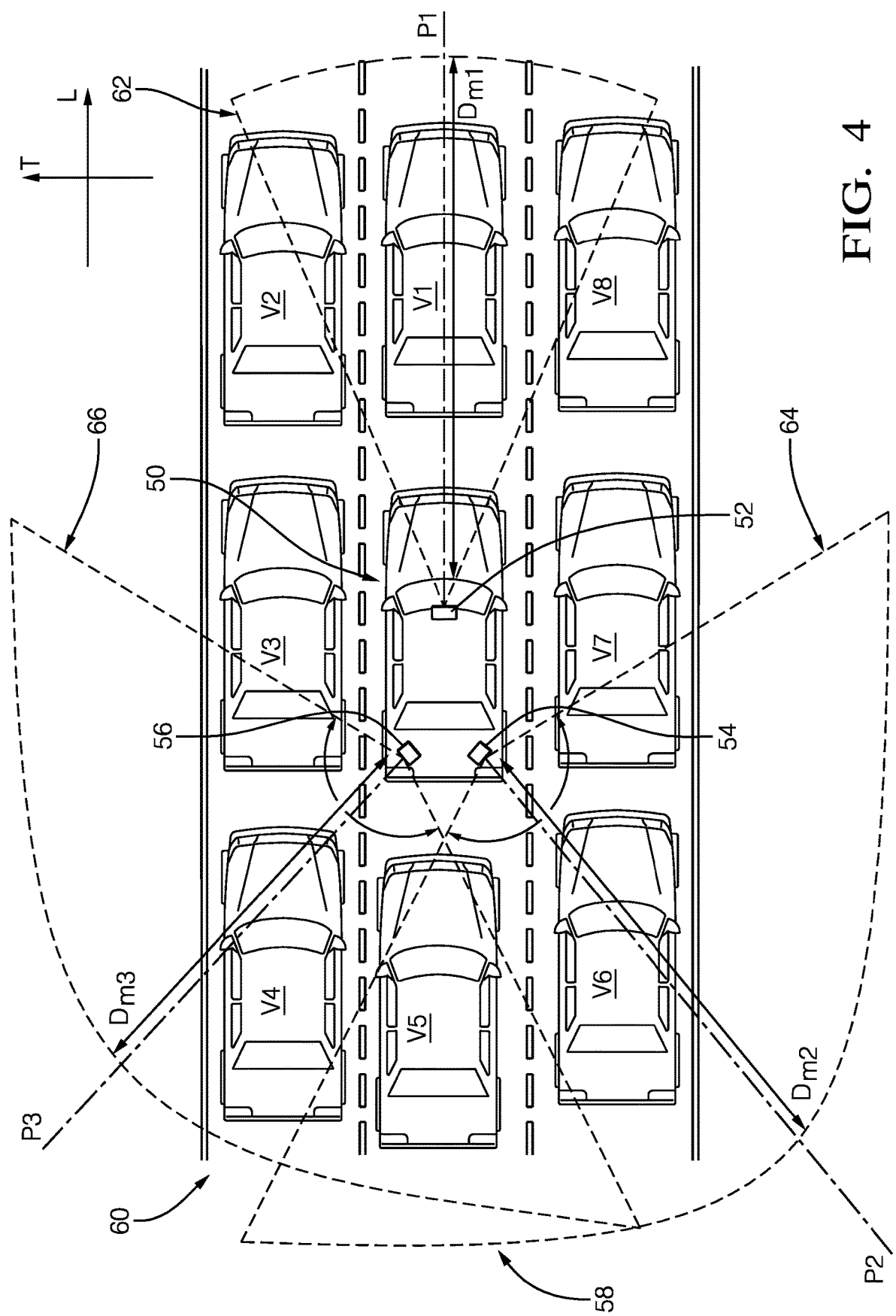
FIG. 4 is a schematic representation of several radar devices arranged in a host vehicle and operating in a common mode during heavy road traffic.

According to FIG. 4, a host vehicle 50 comprises three radar devices similar to the radar device 10 of FIG. 1 and FIG. 2. A first radar device 52 allows the detection of object in the front area of the host vehicle 10, a second radar device 54 allows the detection of object in the right rear area of the host vehicle 50 and a third radar device 56 allows the detection of object in the left rear area of the host vehicle 50. Each radar device 52, 54, 56 is configured to each transmit a transmission radar signal along its own main transmission axis P1, P2, P3 in its own field of view 62, 64, 66.

In a manner not limited to the invention, the host vehicle 50 travels on the central lane 58 of a road 60 comprising three lanes. The host vehicle 50 is in a road traffic situation according to which a plurality of other vehicles V1, V2, V3, V4, V5, V6, V7, V8 surround the host vehicle 50. More particularly, vehicles V1, V2, V3, V4, V5, V6, V7, V8 are directly in the vicinity of the front of the host vehicle 50, of the rear of the host vehicle, of the right side and left side of the host vehicle 50, on the left front and right front of the host vehicle 50, as well as on the right rear and left rear of the host vehicle 50.

According to this particular situation of road traffic, the other vehicles V1, V2, V3, V4, V5, V6, V7, V8 travel in the same direction as the host vehicle 50. This road traffic configuration may be for example a situation of queues at road tolls, at red lights or of traffic jam on wide lanes such as highways.

According to a usual operation, each radar device 52, 54, 56 transmits a radar signal at a determined object detection nominal power in order to detect at least one target vehicle V1, V2, V3, V4, V5, V6, V7, V8 generally up to a maximum distance Dm1, Dm2, Dm3 (Figure not to scale) much greater than about ten meters in his field of view 62, 64, 66. According to FIG. 4, each radar device 52, 54, 56 detects one or more target vehicle(s) V1, V2, V3, V4, V5, V6, V7, V8 located in the vicinity of the host vehicle 50 so that a wide portion of each field of view 62, 64, 66 of each radar device 52, 54, 56 is obstructed. In other words, by the presence of the target vehicles V1, V2, V3, V4, V5, V6, V7, V8 in the direct vicinity of the host vehicle 50, each radar device 52, 54, 56 of the host vehicle 50 is in unable to directly detect other vehicles traveling along the road 60.

Figure 5:
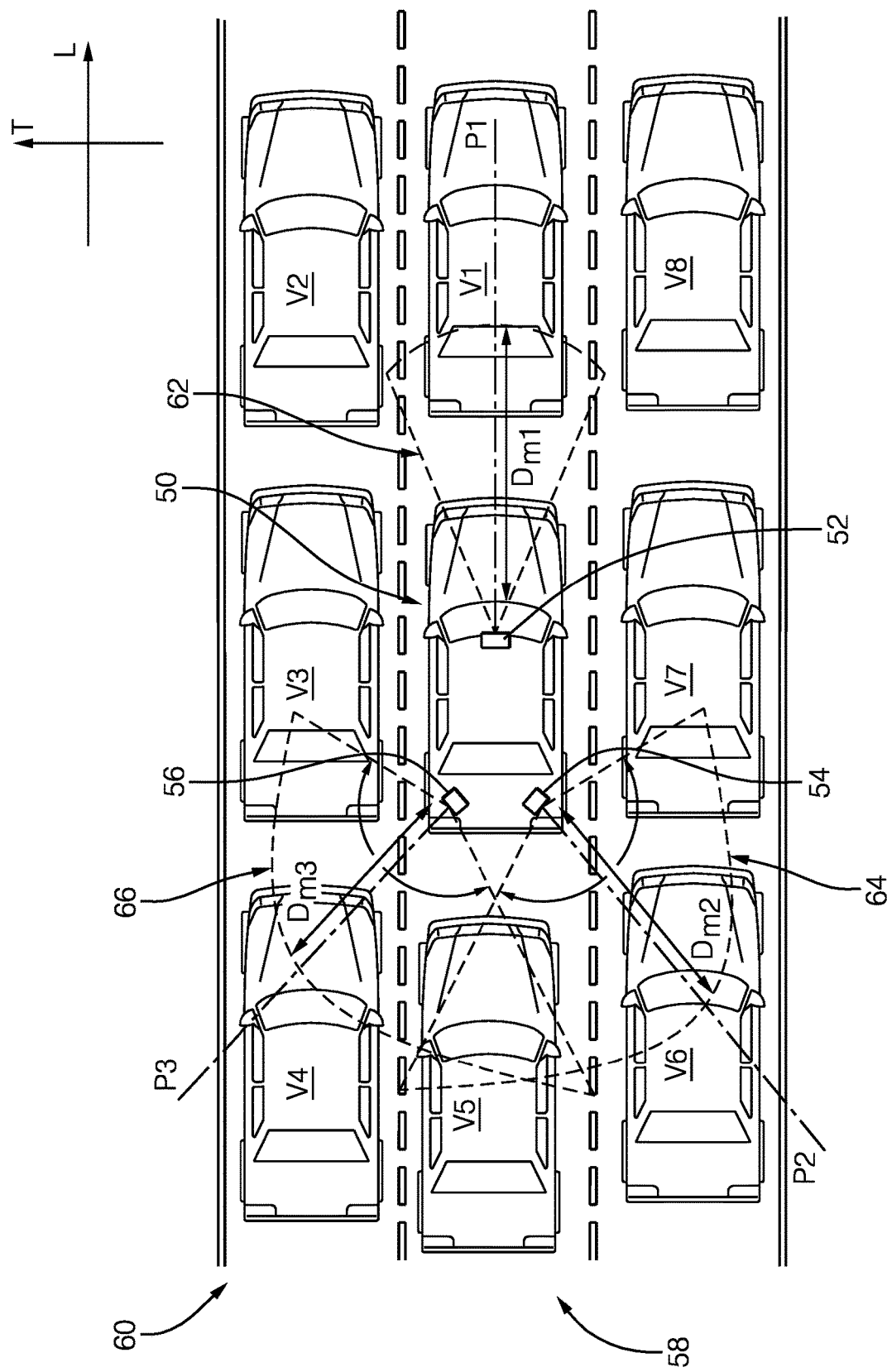
FIG. 5 is a schematic representation of several radar devices arranged in a host vehicle and operating according to an operating mode.

According to FIG. 5, the host vehicle 50 is in the situation of road traffic identical to FIG. 4. According to the method 100 for controlling the radar device 10 described in FIG. 3, the maximum object detection distance Dm1, Dm2, Dm3 from each radar device 52, 54, 56 has been reduced by reducing the transmission power according to a necessary minimum power level allowing each radar device 52, 54, 56 to detect the target vehicles V1, V2, V3, V4, V5, V6, V7, V8 located in direct vicinity of the host vehicle 50. More specifically, the controller 14 of each radar device 52, 54, 56 has determined a rate of obstruction of each field of view 62, 64, 66 of each radar device 52, 54, 56 higher than a preset obstruction rate threshold.

Figure 6:
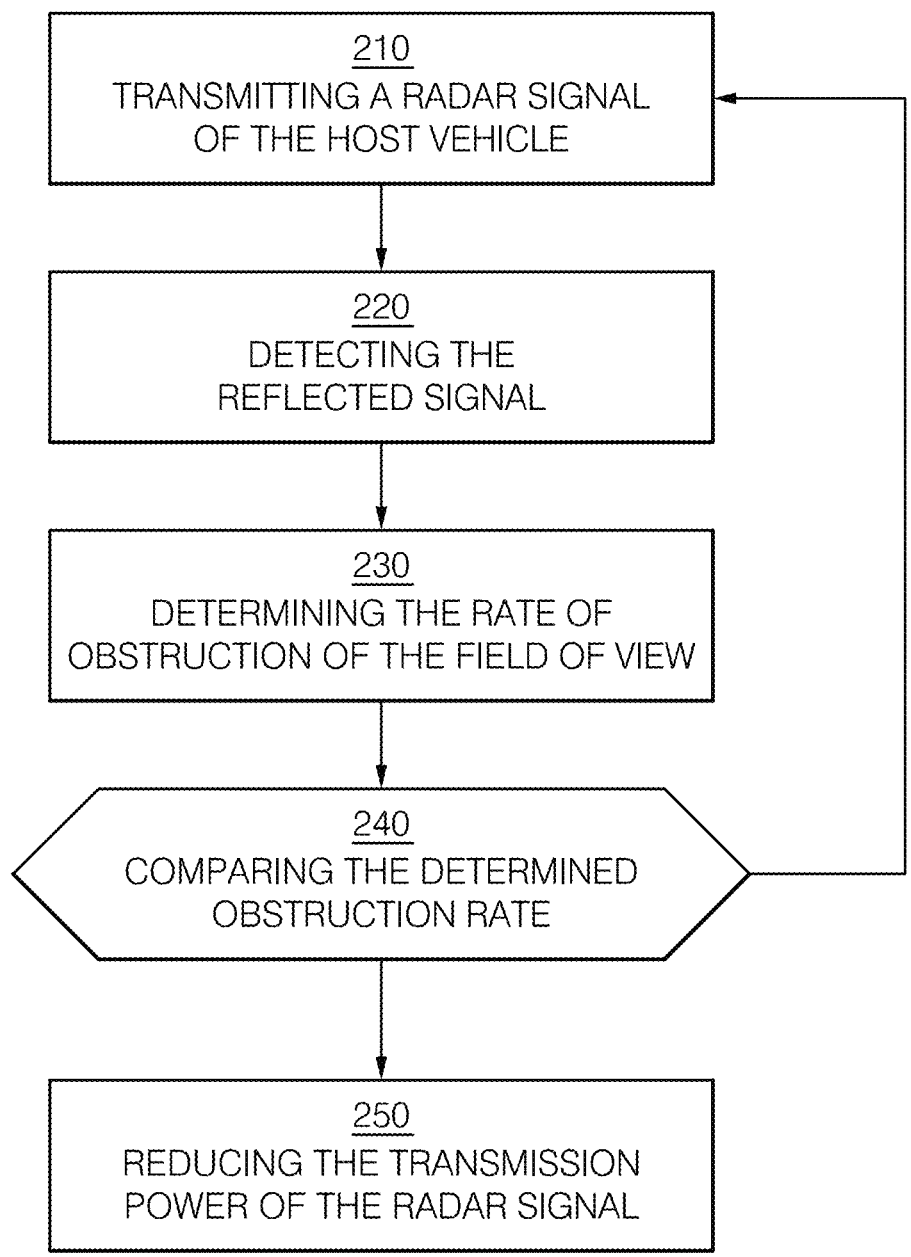
FIG. 6 is a flowchart of a method for controlling the radar device of FIG. 1 when the radar device is arranged in a host vehicle.

According to FIG. 6, when a radar device 52, similar to the radar device 10 described and illustrated in FIG. 1 and in FIG. 2, is arranged in the host vehicle 50 as illustrated in FIGS. 4 and 5, the method for controlling the radar device 52 arranged in the host vehicle 200 comprises several steps of adjusting the transmission power of the radar device according to the detection of target vehicles. More particularly, the control method 200 comprises a step 210 of transmitting a radar signal 20 of the host vehicle 50 according to a determined object detection power 16. Then the method comprises a step 220 of detecting the reflected signal 22 derived from the transmitted radar signal 20 in order to determine the presence of a target vehicle V1 in the field of view 62 of the radar device 52. A next step comprises the determination 230 of the rate of obstruction of the field of view 62 of the radar antenna 12 and a step 240 of comparing the determined obstruction rate with a preset obstruction rate threshold. Finally, the method comprises a step 250 of reducing the transmission power of the radar signal 20 to a minimum target vehicle V1 detection power when the obstruction rate is higher than the preset obstruction rate threshold.

Figure 7:
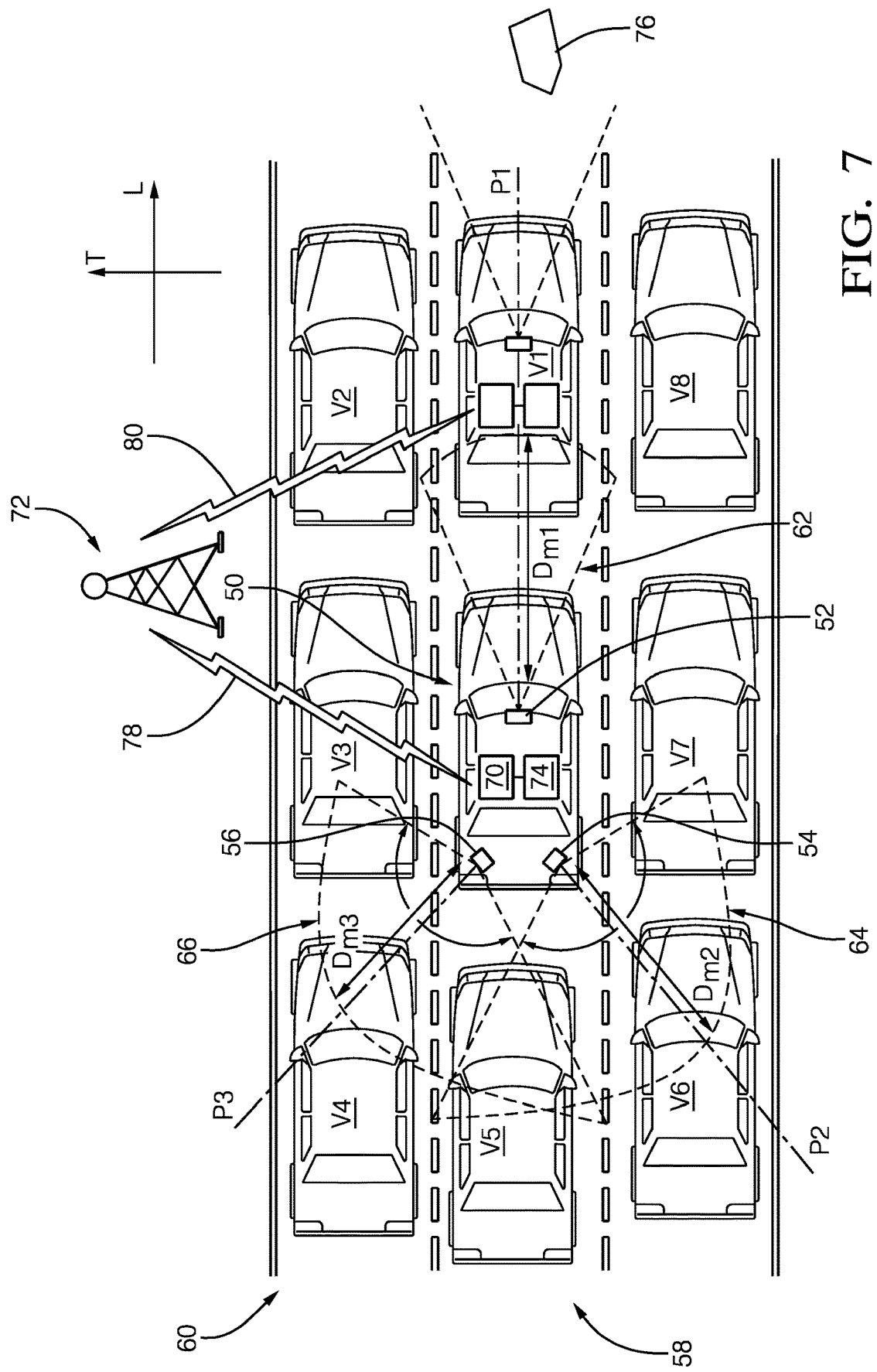
FIG. 7 is a schematic representation of the host vehicle traveling in heavy road traffic and detecting an object located in an area of obstructed field of view of a radar device of the host vehicle.

According to FIG. 7, the host vehicle 50 is equipped with a vehicle-to-vehicle communication means 70 that can communicate directly with other vehicles V1 or indirectly with other vehicles V1 through a server 72 broadcasting information received from other vehicles. This vehicle-to-vehicle communication system 70 is designated by the term 'vehicle to everything (V2X)'. The host vehicle 50 also comprises an object detection device 74, the object detection device 74 being in communication with the radar devices 52, 54, 55 as described in FIGS. 4 and 5.

According to the invention, in order to detect another object 76 located in the area of an obstructed field of view 62 of a radar device 52 by a target vehicle V1, and when the radar device 52 has adjusted the power level of the transmitted radar signal according to a reduced power level, the object detection device 74 initially comprising the radar device 52 connects to the vehicle-to-vehicle communication means 70 in order to detect data relating to the presence of other objects 76 in the portion of its obstructed field of view.

More particularly, the host vehicle 50 comprises an object detection system 74 comprising the radar device 52 and allocating a function of detecting an object in the field of view of the radar device 52 to the vehicle-to-vehicle communication system 70 when the rate of obstruction of the field of view 62 is higher than the preset obstruction rate threshold. The vehicle-to-vehicle communication system 70 being configured to determine the location coordinates of the obstructed field of view, in order to detect the presence of object 76 in the field of view obstructed by the target vehicle V1, the vehicle-to-vehicle communication system 70 is configured to detect data 78, received by said vehicle-to-vehicle communication system 70, relating to an object 76 present in the field of view 62 obstructed according to the determined location coordinates.

By way of example and in a non-limiting manner, according to FIG. 7, the target vehicle V1 located to the front of the host vehicle 50 and obstructing the field of view 62 of the first radar device 52 of the host vehicle 50 detects the presence of an object 76 via its own radar device. The data 80 of the target vehicle 1, relating to the presence of the detected object 76 and to the location coordinates of the object 76 are broadcast to the road traffic information server 72 by a vehicle-to-vehicle communication device of the target vehicle V1. The vehicle-to-vehicle communication system 70 of the host vehicle 50 receives the data 78 relating to the presence of the detected object and to its location coordinates so that the object detection system 74 of the host vehicle 50 can correlate this information with the location coordinates of the area of the obstructed field of view. Thus, the host vehicle 50 can indirectly detect the located object in an area of the field of view of one of its obstructed radar devices 52.

Figure 8:
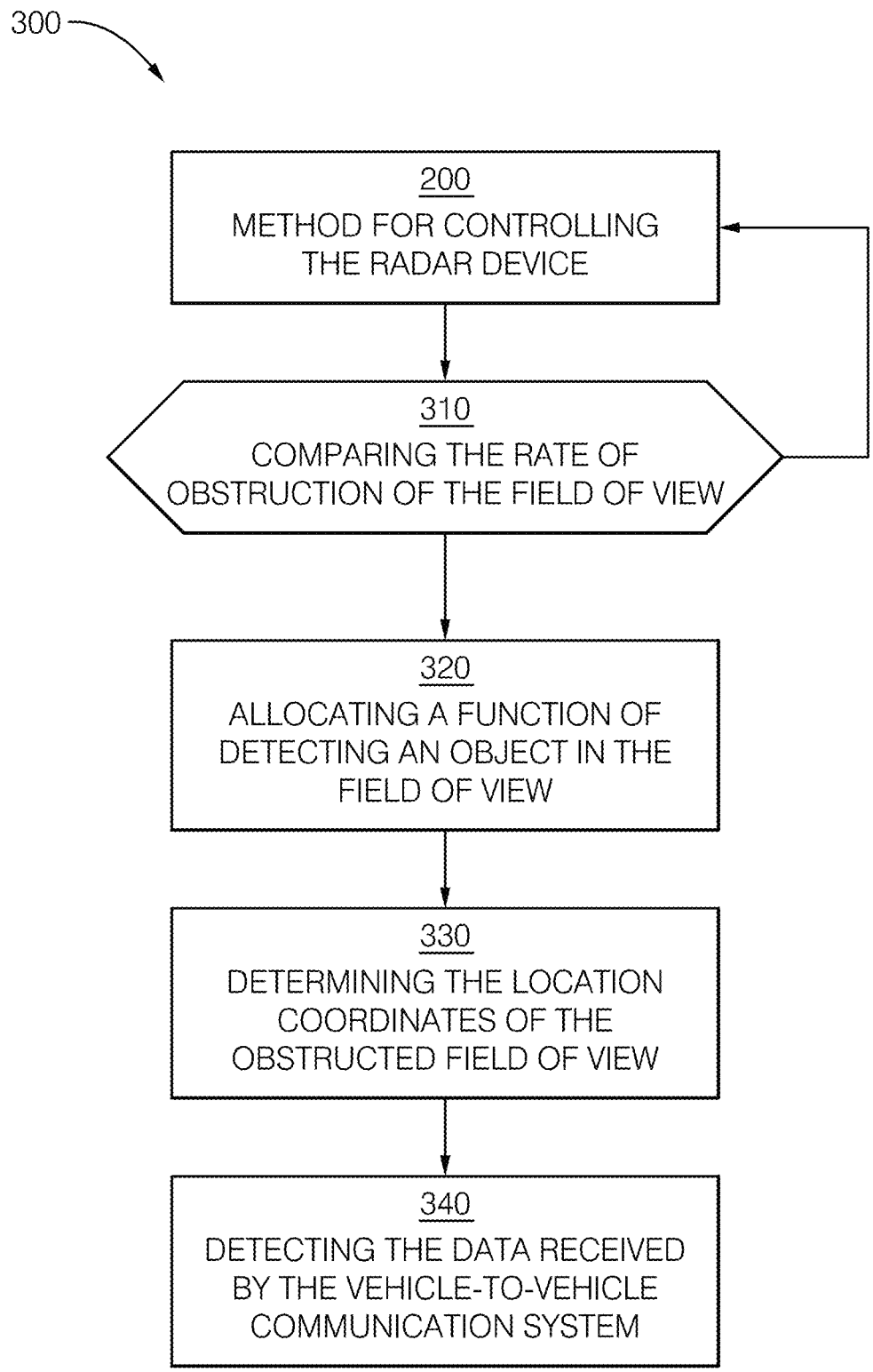
FIG. 8 is a flowchart of a method for detecting an object by the host vehicle when the field of view of a radar device the host vehicle is obstructed.

According to FIG. 8, a method 300 for detecting an object 76 by the host vehicle 50 comprising a vehicle-to-vehicle communication system 70 and including the method 200 for controlling the radar device 52 arranged in the host vehicle 50, comprises a step 310 of comparing the rate of obstruction of the field of view 62 of a radar device 52 with the preset obstruction rate threshold, a step 320 of allocating a function of detecting an object in the field of view 62 of the radar device 52 to the vehicle-to-vehicle communication system 70 when the obstruction rate is higher than the preset obstruction rate threshold. The object detection method 300 comprises a step 330 of determining the location coordinates of the obstructed field of view 62 and finally a step 340 of detecting the data 78, received by the vehicle-to-vehicle communication system 70, relating to an object 76 present in the obstructed field of view 62 according to the determined location coordinates.

While this invention has been described in terms of the preferred embodiments thereof, it is not intended to be so limited, but rather only to the extent set forth in the claims that follow.

We claim:

1. A radar device for a vehicle comprising:
   a radar antenna configured to detect a reflected signal from a reflection of a transmitted signal reflected by an object present in a field of view of the radar antenna, the reflected signal comprises a plurality of reflected waves distributed in the field of view of the radar antenna; and
   a controller configured to:
      cause at least one radar signal to be transmitted from the radar antenna, the radar signal being transmitted at a predetermined transmission power of object detection for detecting a presence of obstacles distant from the radar device and further for enabling object ranging to the obstacles distant from the radar device;
      detect a power level and an angular orientation, along a main axis of the field of view, of the reflected signal arising from each of the plurality of reflected waves;
      determine a rate of obstruction of the field of view based on the power level and angular orientation of the reflected signal arising from each of the plurality of reflected waves;
      compare the rate of obstruction with a present obstruction rate threshold; and
      adjust the at least one radar signal to have a second transmission power when the rate of obstruction is higher than the present obstruction rate threshold, the second transmission power being based on the power level of the reflected signal arising from each of the plurality of reflected waves, and corresponding to a minimum power for merely detecting presence of obstacles near the radar device to conserve energy consumption by the radar device in transmitting the at least one radar signal.

2. The radar device according to claim 1, wherein the controller is further configured to:
   transmit a plurality of successive radar signals based on the power level of the reflected signal arising from each of the plurality of reflected waves; and
   adjust the at least one radar signal to have the second transmission power based on average of the power levels of the reflected signal arising from each of the plurality of reflected waves.

3. A method for controlling energy consumption by a radar device, the method comprising:
   transmitting, from a radar antenna of the radar device and at a predetermined transmission power of object detection, at least one radar signal, at a predetermined transmission power of object detection for detecting a presence of obstacles distant from the radar device and further for enabling object ranging to the obstacles distant from the radar device;
   detecting, with the radar antenna, a reflected signal from a reflection of the at least one signal reflected by an object present in a field of view of the radar antenna, the reflected signal comprises a plurality of reflected waves distributed in the field of view of the radar antenna;
   detecting a power level and an angular orientation, along a main axis of the field of view, of the reflected signal arising from each of the plurality of reflected waves;
   determining a rate of obstruction of the field of view based on the power level and angular orientation of the reflected signal arising from each of the plurality of reflected waves;
   comparing the rate of obstruction with a present obstruction rate threshold; and
   adjusting the at least one radar signal to have a second transmission power when the obstruction rate is higher than the present obstruction rate threshold, the second transmission power being based on the power level of the reflected signal arising from each of the plurality of reflected waves, and corresponding to a minimum power for merely detecting presence of obstacles near the radar device to conserve energy consumption by the radar device in transmitting the at least one radar signal.

4. The control method according to claim 3, wherein
   transmitting the at least one radar signal comprises the successive transmission of a plurality of radar signals with the predetermined transmission power; and
   adjusting the at least one radar signal to have the second transmission power is based on an average of the power levels of the reflected signal arising from each of the plurality of reflected waves.

5. The method of claim 4, wherein the radar device is arranged in a vehicle.

6. The method of claim 5, wherein the vehicle comprises a vehicle-to-vehicle communication system, the method further comprising:
   allocating execution of a function of detecting an object in the field of view to the vehicle-to-vehicle communication system when the rate of obstruction is higher than the present obstruction rate threshold;
   determining location coordinates of the obstructed field of view; and
   receiving, from the vehicle-to-vehicle communication system, data relating to an object present in the field of view obstructed based on the determined location coordinates.

7. A radar system for a vehicle, the radar system comprising:
   a radar antenna configured to detect a reflected signal from a reflection of a transmitted signal reflected by an object present in a field of view of the radar antenna, the reflected signal comprises a plurality of reflected waves distributed in the field of view of the radar antenna; and
   a connection configured to exchange data with a vehicle-to-vehicle communication system; and
   a controller configured to:
      cause at least one radar signal to be transmitted from the radar antenna, the radar signal being transmitted at a predetermined transmission power of object detection for detecting a presence of obstacles distant from the radar system and further for enabling object ranging to the obstacles distant from the radar system;

detect a power level and an angular orientation, along a main axis of the field of view, of the reflected signal arising from each of the plurality of reflected waves;

determine a rate of obstruction of the field of view based on the power level and angular orientation of the reflected signal arising from each of the plurality of reflected waves;

compare the rate of obstruction with a present obstruction rate threshold; and when the rate of obstruction is higher than the present obstruction rate threshold:

configure the radar system to conserve energy consumption by adjusting the at least one radar signal to have a second transmission power that is based on the power level of the reflected signal arising from each of the plurality of reflected waves and a minimum power for merely detecting presence of obstacles near to the radar system; and allocate, to the vehicle-to-vehicle communication system, execution of a function of detecting an object present in the field of view to receive, from the connection with the vehicle-to-vehicle communication system, data relating to the object present; and define, based on the data relating to the object, location coordinates of an obstructed area within the field of view.

8. The radar system of claim 7, wherein the controller is further configured to:

transmit a plurality of successive radar signals based on the power level of the reflected signal arising from each of the plurality of reflected waves; and adjust the at least one radar signal to have the second transmission power based on average of the power levels of the reflected signal arising from each of the plurality of reflected waves.

* * * * *